United States Patent
Chen et al.

(10) Patent No.: US 11,093,303 B2
(45) Date of Patent: Aug. 17, 2021

(54) NOTIFICATION MESSAGE PROCESSING METHOD AND APPARATUS

(71) Applicant: Alibaba Group Holding Limited, Grand Cayman (KY)

(72) Inventors: Zhaoyu Chen, Hangzhou (CN); Yulong Liu, Hangzhou (CN); Kun Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 171 days.

(21) Appl. No.: 16/026,752

(22) Filed: Jul. 3, 2018

(65) Prior Publication Data

US 2018/0321992 A1    Nov. 8, 2018

Related U.S. Application Data

(63) Continuation of application No. PCT/CN2016/113447, filed on Dec. 30, 2016.

(30) Foreign Application Priority Data

Jan. 5, 2016  (CN) .......................... 201610006150.2

(51) Int. Cl.
*G06F 15/16* (2006.01)
*G06F 9/54* (2006.01)
(Continued)

(52) U.S. Cl.
CPC ................ *G06F 9/542* (2013.01); *G06F 9/44* (2013.01); *G06F 16/245* (2019.01);
(Continued)

(58) Field of Classification Search
CPC ........ G06F 9/542; G06F 9/44; G06F 16/5866; G06F 16/245; G06F 9/451; H04L 67/26; H04L 67/20; G06K 9/00442
See application file for complete search history.

(56) References Cited

U.S. PATENT DOCUMENTS

| 8,635,124 B1* | 1/2014 | Hamilton ........... G06Q 30/0601 705/27.1 |
| 2009/0113452 A1* | 4/2009 | Grigsby .................. G06F 9/542 719/318 |

(Continued)

FOREIGN PATENT DOCUMENTS

| CN | 103259825 A | 8/2013 |
| CN | 104869248 A | 8/2015 |

(Continued)

OTHER PUBLICATIONS

The Extended European Search Report dated Jun. 4, 2019 for European Patent Application No. 16883465.3, a counter part of U.S. Appl. No. 16/026,752, 8 pages.

(Continued)

*Primary Examiner* — John B Walsh
(74) *Attorney, Agent, or Firm* — Lee & Hayes, P.C.

(57) ABSTRACT

A method and an apparatus for processing a notification message are provided. The method mainly includes monitoring a notification message of an application through an interface of an auxiliary function of an operating system of a smart electronic device; and in response to detecting that the notification message includes a predefined keyword, performing corresponding processing on the notification message that includes the predefined keyword according to a processing method corresponding to the predefined keyword. The technical solutions of the present disclosure can perform different processing for different notification messages, enriching processing methods of notification messages, while preventing the notification messages from interrupting users, thus improving the degree of intelligentization of processing of the notification messages.

20 Claims, 9 Drawing Sheets

(51) Int. Cl.
  *G06F 16/245* (2019.01)
  *G06F 16/58* (2019.01)
  *G06F 9/44* (2018.01)
  *G06K 9/00* (2006.01)
  *H04L 29/08* (2006.01)

(52) U.S. Cl.
  CPC ..... *G06F 16/5866* (2019.01); *G06K 9/00442* (2013.01); *H04L 67/20* (2013.01); *H04L 67/26* (2013.01)

(56) References Cited

U.S. PATENT DOCUMENTS

| | | | |
|---|---|---|---|
| 2013/0054248 A1* | 2/2013 | Ohno | H04N 9/3179 704/275 |
| 2013/0301813 A1 | 11/2013 | Shaffer et al. | |
| 2015/0111189 A1* | 4/2015 | Chiu | G06F 16/148 434/308 |
| 2015/0229977 A1* | 8/2015 | Kanigsberg | H04N 21/44222 725/10 |
| 2015/0271630 A1* | 9/2015 | Ferrara | H04W 8/18 455/456.3 |
| 2017/0111693 A1* | 4/2017 | Wang | H04N 21/4788 |
| 2019/0012219 A1* | 1/2019 | Kim | G06F 16/95 |

FOREIGN PATENT DOCUMENTS

| | | |
|---|---|---|
| CN | 104980585 A | 10/2015 |
| CN | 105120053 A | 12/2015 |
| CN | 105138229 A | 12/2015 |

OTHER PUBLICATIONS

Fumera et al, "Spam Filtering Based on the Analysis of Text Information Embedded into Images", Journal of Machine Learning Research, vol. 7, MIT Press, Cambridge, MA, Dec. 1, 2006, pp. 2699-2720.

Translated Chinese Office Action and Search Report for Chinese Application No. 201610006150.2, dated Nov. 29, 2017, 14 pages.

Translated Chinese Office Action for Chinese Application No. 201610006150.2, dated May 30, 2018, 9 pages.

Translated Chinese Office Action for Chinese Application No. 201610006150.2, dated Aug. 30, 2018, 11 pages.

PCT Search Report and Written Opinion dated Apr. 7, 2017 for PCT Application PCT/CN2016/113447.

The European Office Action dated Jun. 25, 2020 for European Patent Application No. 15856746.1, a counterpart of U.S. Appl. No. 16/026,752, 8 pages. counterpart.

Shelly et al, "Operating Systems and Utility Programs," Discovering Computers: Fundaments, Course Technology, Cengage Learning, Boston, Feb. 28, 2012, pp. 269-300.

* cited by examiner

NOTIFICATION MESSAGE PROCESSING METHOD AND APPARATUS

CROSS REFERENCE TO RELATED PATENT APPLICATIONS

This application claims priority to and is a continuation of PCT Patent Application No. PCT/CN2016/113447 filed on 30 Dec. 2016, and is related to and claims priority to Chinese Patent Application No. 201610006150.2, filed on 5 Jan. 2016, entitled "Notification message Processing Method and Apparatus," which are hereby incorporated by reference in their entirety.

TECHNICAL FIELD

The present disclosure relates to the technical field of the Internet, and particularly to methods and apparatuses for processing a notification message.

BACKGROUND

Along with the rapid development of mobile Internet technologies, smart electronic devices, especially smart mobile phones, have become increasingly popular. The types of applications provided for smart electronic devices, especially smart mobile phones, have become more abundant in variety.

In situations such as when an application in a smart electronic device receives a new message or a certain reminding event in the application is triggered, a notification message is usually generated, and an operation of notification related to this notification message is executed to help prompting a user to read the new message or to pay attention to an event that is pre-arranged in time, for example. As a specific example, when a new message comes to WeChat, WeChat will display a notification message of this new message on a notification panel of an operating system or lock screen interface, and prompt a user to read the new message through a means such as voice or vibration. As another specific example, when a time corresponding to a reminder event in a calendar application is reached at a current time, the reminder event in the calendar application is triggered. The calendar application displays a notification message describing this reminder event on a lock screen interface or a front page of a smart electronic device, and prompts a user to pay attention to this reminder event through a means such as voice or vibration.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

During implementations of the present disclosure, inventors notice that methods of processing notification messages of different applications are approximately the same, though types and number of applications continue to vary and increase. In other words, methods of processing notification messages are relatively simple.

A goal of the present disclosure is to provide a method and an apparatus for processing a notification message.

According to an aspect of the present disclosure, a method of processing a notification message is provided. The method includes the following steps: monitoring a notification message of an application through an interface of an auxiliary function of an operating system of a smart electronic device; and in response to detecting that the notification message includes a predefined keyword, performing corresponding processing on the notification message that includes the predefined keyword according to a processing method corresponding to the predefined keyword.

According to another aspect of the present disclosure, an apparatus of processing a notification message is provided. The apparatus includes a monitoring module used for monitoring a notification message of an application through an interface of an auxiliary function of an operating system of a smart electronic device; and a processing module used for, in response to detecting that the notification message includes a predefined keyword, performing corresponding processing on the notification message that includes the predefined keyword according to a processing method corresponding to the predefined keyword.

Compared with existing technologies, the present disclosure has the following advantages. By monitoring a notification message of an application using an interface of an auxiliary function of an operating system of a smart electronic device, the present disclosure can obtain the notification message of the application in a convenient, quick and accurate manner without affecting normal operations of the operating system. By detecting whether a notification message includes a predefined keyword and setting up respective processing methods corresponding to various predefined keywords, the present disclosure can thereby determine a processing method corresponding to the notification message using the predefined keyword when the detected notification message includes the predefined keyword. As such, the present disclosure can perform corresponding processing on the notification message that includes the predefined keyword. Different notification messages can therefore be allowed to correspond to different processing methods, such as providing an enhanced prompt or a warning prompt for a notification message, or conducting information exchange with an application to which the notification message belongs. As can be seen, technical solutions provided by the present disclosure can perform different processing for different notification messages, enriching processing methods of notification messages, while preventing the notification messages from interrupting users, thus improving the degree of intelligentization of processing of the notification messages.

BRIEF DESCRIPTION OF THE DRAWINGS

By reading and referencing accompanying drawings for detailed description of non-limiting embodiments, other features, goals and advantages of the present disclosure can be made more apparently.

Figure 1:
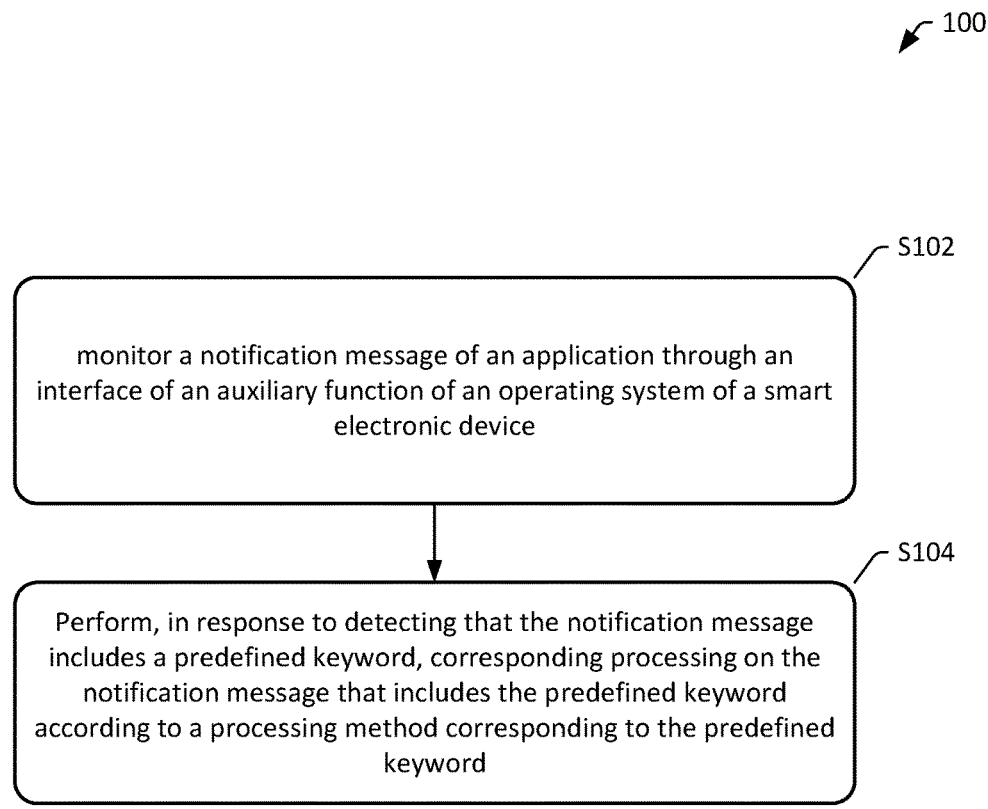
FIG. 1 is a flowchart of a method of processing a notification message in accordance with a first embodiment of the present disclosure.

Same or similar drawing labels in accompanying drawings represent same or similar components.

DETAILED DESCRIPTION

In order to make the goals, technical solutions and advantages of the present disclosure more clearly, the embodiments of the present disclosure are described herein in conjunction with the accompanying drawings.

Before describing the exemplary embodiments in more detail, it should be noted that some exemplary embodiments are described as processes or methods shown by flowcharts. Although flowcharts of the present disclosure describe various operations as sequences, a number of operations therein can be executed in parallel, simultaneously, or at the same time. Furthermore, an order of operations can be rearranged. A process can be ended when operations thereof are completed. Nevertheless, additional operations not shown may also be included. The process can correspond to a method, a function, a procedure, a sub-routine, a routine, etc.

The smart electronic devices include a user device and a network device. The user device includes, but is not limited to, a computer, a smart mobile phone, or PDA, etc. The network device includes, but is not limited to, a single network server, a server group formed by a plurality of network servers, a large number of computers based on cloud computing, or a cloud formed by network servers. The cloud computing is a type of distributed computing, and is a super virtual computer formed by a set of loosely coupled computers. The smart electronic device can connect to a network, and conducts operations of information exchange with other smart electronic devices in the network. The network to which the smart electronic device can connect includes, but is not limited to, the Internet, a wide area network, a metropolitan area network, a local area network, a virtual private network, etc.

It should be noted that the user device, the network device and the network are merely examples. Other smart electronic devices or networks that exist currently or may exist in the future are also applicable to the present disclosure, and should be included in the scope of protection of the present disclosure, which are included herein by reference.

Embodiments of methods (some of which are shown in flowcharts) that are described and discussed hereinafter can be implemented in a form of hardware, software, firmware, middleware, microcode, hardware description language, or any combination thereof. When being implemented using software, firmware, middleware or microcode, program codes or code segments that are used for implementing necessary tasks can be stored in machine or computer readable media (such as storage media). (One or more) processors can execute the necessary tasks.

Details of structures and functions disclosed herein are merely representative, and are used for the purpose of describing the exemplary embodiments of the present disclosure. However, the present disclosure can be implemented through a number of alternative forms, and should not be interpreted to be only limited to the embodiments described herein.

It should be noted that, although terms such as "first" and "second", etc., are used herein for describing various units, these units should not be limited by these terms. These terms are used merely for distinguishing one unit from another unit. For example, without departing the scope of the exemplary embodiments, a first unit can be called as a second unit, and similarly the second unit can be called as the first unit. A term "and/or" used herein includes a combination of any or all of one or more associated items that are listed.

It should be noted that, when a unit is said to be "connected" or "coupled" to another unit, that unit can be directly connected or coupled to the other unit, or an intermediate unit may exist therebetween. Correspondingly, when a unit is said to be "directly connected" or "directly coupled" to another unit, no intermediate unit exists therebetween. Other terms that are used for describing a relationship between units (for example, "in between" as compared to "directly in between", "adjacent to" as compared to "directly adjacent to", etc.) should also be interpreted in a similar way accordingly.

Terms used herein are merely used for describing specific embodiments, and are not intended to limit the exemplary embodiments. Unless clearly stated otherwise in the context, singular forms used herein such as "a" and "an" are also intended to include a plural form. It should also be noted that terms such as "include" and/or "contain" set forth an existence of features, numbers, procedures, operations, units, and/or components that are described, and do not exclude an additional existence of one or more other features, numbers, procedures, operations, units, components, and/or combinations thereof.

It should also be noted that functions/actions described in some alternative implementations may not occur according to an order shown in associated accompanying drawings. For example, depending on functions/actions involved, two figures that are shown successively can be executed substantially at the same or in a reverse order in reality.

The technical solutions of the present disclosure are described in further detail in conjunction with the accompanying drawings.

First Embodiment: A Method of Processing a Notification Message

FIG. 1 is a flowchart of a method 100 of processing a notification message in accordance with the present embodiment. As shown in FIG. 1, the method 100 may include S102 and S104. The method 100 is generally performed in a smart electronic device. In implementations, the method 100 is generally performed in a smart electronic device (i.e., a user device) such as smart mobile phone and a tablet computer, etc. For example, the method 100 can be deployed in an application (e.g., Ali money shield application) that is installed in a smart electronic device. The method 100 can be performed after the application is activated.

Each operation in FIG. 1 is separately described in detail hereinafter.

S102 monitors a notification message of an application through an interface of an auxiliary function of an operating system of a smart electronic device.

Specifically, an auxiliary function of an operating system of a smart electronic device in implementations is used for enabling a user (such as certain disabled users, which may be visually impaired users, for example) to use the smart electronic device without any barrier. For example, an auxiliary function of the operating system can read aloud the text in a user interface of the smart electronic device, or magnify the text in the user interface of the smart electronic device, etc. Operating systems of smart electronic devices generally provide open interfaces of auxiliary functions. The present embodiment achieves monitoring of notification of an application through an interface of an auxiliary function.

As an example, in implementations, the smart electronic device may be a smart electronic device based on an Android operating system. If other operating systems also provide interfaces of auxiliary functions, the smart electronic device in implementations may also be smart electronic devices of the other operating systems.

As an example, in implementations, if an auxiliary function provided by an operating system of a smart electronic device is not in an activated status, an operating of activating the auxiliary function provided by the operating system of the smart electronic device is first performed. For example, a user of the smart electronic device is guided step by step to cause the smart electronic device to set the auxiliary function provided by the operating system of the smart electronic device into an activated status.

As an example, the notification message of the application that is monitored through the interface of the auxiliary function of the operating system of the smart electronic device in implementations may be a notification message of a system application, or may be a notification message of a third-party application. In implementations, a notification message of a system application may be a notification message of a short messaging application, such as a notification message that is generated after a short messaging application receives a new short message. In implementations, a notification message of a third-party application may be a notification message of an instant messaging application, such as a notification message that is generated when a WeChat application receives a new message. In implementations, a notification message of a third-party application may be a notification message of a new message pushed by an application client, such as a notification message that is generated when a Sohu Video client or Tencent news client wants to push new video/news to a user.

As an example, in implementations, monitoring the notification message of the application through the interface of the auxiliary function of the operating system of the smart electronic device may include monitoring information content of the notification message of the application through the interface of the auxiliary function of the operating system of the smart electronic device, such as monitoring whether the content of the notification message of the application includes a predefined keyword of a keyword set through the interface of the auxiliary function of the operating system of the smart electronic device. In implementations, a keyword set generally includes a predefined keyword, or a plurality of different predefined keywords. Furthermore, in implementations, predefined keyword(s) of a keyword set may be predefined keyword(s) that is/are downloaded from a cloud server (for example, updating a keyword set that is locally stored in a smart electronic device from a cloud server regularly or irregularly), or predefined keyword(s) that is/are self-defined by a smart electronic device (i.e., predefined keyword(s) that is/are defined by a user of the smart electronic device himself/herself can also be stored in a keyword set).

Details of an implementation of the first example described above are given. The present embodiment obtains information content of a notification message through an interface of an auxiliary function of an operating system of a smart electronic device. In an event that the information content of the notification message includes textual information (such as the entire information content of the notification message is textual information), the present embodiment can perform matching of the textual information of the notification message according to predefined keyword(s) of a locally stored keyword set (separately performing matching and querying of each predefined keyword for the textual information of the notification message if the keyword set includes a plurality of different predefined keywords) to determine whether the textual information of the notification message includes information that matches with a predefined keyword of the keyword set. In response to a search result indicating that information of a predefined keyword of the keyword set exists in the textual information of the notification message, a determination is made that a notification message that is detected includes a predefined keyword. Otherwise, a determination is made that the notification message does not include a predefined keyword. For a more specific example, a keyword set may be set to include a predefined keyword "red pocket". After a notification message is obtained through an interface of an auxiliary function of an operating system of a smart electronic device and when information content of the notification message includes textual information, the present embodiment match and search the textual information of the notification message according to the predefined keyword "red pocket" to determine whether information matching with the predefined keyword "red pocket" exists in the textual information of the notification message. In response to a search result indicating that the information matching with the predefined keyword "red pocket" exists in the textual information of the notification message, a determination is made that the notification message that is detected includes the predefined keyword "red pocket". Otherwise, a determination is made that the notification message does not include the predefined keyword "red pocket".

Details of another implementation of the first example described above may include the following. The present embodiment can obtain information content of a notification message through an interface of an auxiliary function of an operating system of a smart electronic device. In an event that the information content of the notification message includes a picture (such as all or part of the information content of the notification message is a picture), the present embodiment can first perform image recognition on the picture in the notification message to convert the picture in the notification message into textual information. The present embodiment then performs matching of the textual information that is obtained from the image recognition according to predefined keyword(s) of a locally stored keyword set (the present embodiment can separately perform matching and querying of each predefined keyword for the textual information that is obtained from the image recognition if the keyword set includes a plurality of different predefined keywords) to determine whether the textual information that is obtained from the image recognition includes information that matches with a predefined keyword of the keyword set. In response to a search result indicating that information of a predefined keyword of the keyword set exists in the textual information that is obtained from the image recognition, a determination is made that a notification message that is detected includes a predefined keyword. Otherwise, a determination is made that the notification message does not include a predefined keyword. For a more specific example, a keyword set may be set to include a predefined keyword "red pocket". After a notification message is obtained through an interface of an auxiliary function of an operating system of a smart electronic device and when information content of the notification message includes a picture (i.e., all or part of the information content of the notification message is the picture), the present embodiment first performs image recognition on the picture in the notification message to convert the notification message into textual information. Matching and searching of the textual information that is obtained from the image recognition are then performed according to the predefined keyword "red pocket" to determine whether information matching with the predefined keyword "red pocket" exists in the textual information that is obtained from the image recognition. In response to a search result indicating that the information matching with the "red pocket" exists in the textual information that is obtained from the image recognition, a determination is made that the notification message that is detected includes the "red pocket". Otherwise, a determination is made that the notification message does not include the "red pocket".

It should be noted that, when the present embodiment obtains a notification message through an interface of an auxiliary function of an operating system of a smart electronic device and information content of the notification message includes textual information and a picture, the present embodiment can determine whether the textual information in the notification message includes a predefined keyword. Alternatively, a determination can be made as to whether the picture in the notification message includes a predefined keyword. Alternatively, a determination can be made as to whether the textual information in the notification message includes a predefined keyword and whether the picture in the notification message includes a predefined keyword. A detailed process thereof is not described in detail again. Similarly, the present embodiment does not individually describe a second example, a third example and a fourth example which are described below in detail.

As a second example, details of the present embodiment of monitoring the notification message of the application through the interface of the auxiliary function of the operating system of the smart electronic device may include monitoring information content of the notification message of the application and application property information of the application to which the notification message belongs through the interface of the auxiliary function of the operating system of the smart electronic device. For example, monitoring is performed on a notification message of an application as to whether information content thereof includes a predefined keyword of a keyword set and whether application property information of the application to which the notification message belongs satisfies predefined condition(s) (the predefined condition(s) can be called as predefined application property condition(s)) through an interface of an auxiliary function of a smart electronic device. In implementations, application property information may include any one or more of a packet name of an application, a name of the application, a type of the application (such as a system application or a third-party application), a space occupied by the application after installation, and memory occupied by the application after launch. In implementations, a predefined application property condition is generated set in conjunction with a predefined keyword. Furthermore, in a normal situation, a single predefined keyword may be configured with and correspond to a single predefined application property condition. In a real application, however, the present embodiment does not exclude situations in which a single predefined keyword is configured with and correspond to multiple predefined application property conditions. Moreover, in implementations, a predefined application property condition can be a predefined application property condition downloaded from a cloud server (such as updating predefined application property conditions that are local to a smart electronic device from the cloud server regularly or irregularly), or a predefined application property condition that is self-defined by a smart electronic device (i.e., a user of the smart electronic device can set a predefined application property condition on his/her own). The present embodiment can flexibly set up predefined application property conditions based on content included in application property information according to an actual need. Examples of how to individually set up predefined application property conditions based on content of application property information are not described in detail herein.

Details of another implementation of the above second example are given. The present embodiment obtains information content of a notification message and application property information of an application to which the notification message belongs through an interface of an auxiliary function of an operating system of a smart electronic device. When the information content of the notification message includes textual information (such as all the information content of the notification message is textual information), the present embodiment matches and searches the textual information of the notification message for a predefined keyword in a locally stored keyword set (when the keyword set includes a plurality of different predefined keywords, the present embodiment can separately matches and searches the textual information of the notification message for each predefined keyword), to determine whether information matching with the predefined keyword in the keyword set exists in the textual information of the notification message. When a search result indicates that no information matching with a predefined keyword in the keyword set exists in the textual information of the notification message, a determination is made that the notification message does not includes a predefined keyword. When a search result indicates that information matching with a predefined keyword in the keyword set exists in the textual information of the notification message, the present embodiment continues to determine whether the application property information that is obtained satisfies predefined application property condition(s) corresponding to the predefined keyword that is included in the notification message. If the obtained application property information satisfies the predefined application property condition(s) corresponding to the predefined keyword that is included in the notification message, a determination can be made that the detected notification message includes the predefined keyword and the application property information of the application to which the notification message belongs satisfies the predefined application property condition(s). Otherwise, a determination can be made that the detected notification message includes the predefined keyword and the application property information of the application to which the notification message belongs fails to satisfy the predefined application property condition(s). For a more specific example, a keyword set is set to include a predefined keyword "red pocket", and a predefined application property condition corresponding to this predefined keyword "red pocket" is an application packet name being "com.tencent.mm" (i.e., a WeChat packet name that is officially defined by WebChat). After obtaining information content of a notification message and application property information of an application to which the notification message belongs through an interface of an auxiliary function of an operating system of a smart electronic device, and when the information content of the notification message includes textual information (such as all the information content of the notification message is textual information), the present embodiment matches and searches the textual information of the notification message according to the predefined keyword "red pocket", to determine whether information matching with "red pocket" exists in the textual information of the notification message. When a search result indicates that the textual information of the notification message does not include information matching with the predefined keyword "red pocket", a determination is made that the notification message does not include the predefined keyword "red pocket". When a search result indicates that the textual information of the notification message includes information matching with the predefined keyword "red pocket", the present embodiment further determines whether an application packet name of an application to which the notification message belongs is "com.tencent.mm". If the application packet name of the application to which the notification message belongs is "com.tencent.mm", a determination is made that the notification message including "red pocket" is detected, and the application property information of the application to which the notification message belongs satisfies the predefined application property condition. Otherwise, a determination is made that the application property information of the application to which the notification message belongs does not satisfy the predefined application property condition even though the notification message including "red pocket" is detected.

Details of another implementation of the above second example are given. The present embodiment obtains information content of a notification message and application property information of an application to which the notification message belongs through an interface of an auxiliary function of an operating system of a smart electronic device. When the information content of the notification message includes a picture (such as all or part of the information content of the notification message is picture(s)), the present embodiment can first perform image recognition on the picture in the notification message to convert the picture in the notification message into textual information. The present embodiment then performs matching of the textual information that is obtained from the image recognition according to predefined keyword(s) of a locally stored keyword set (the present embodiment can separately perform matching and querying of each predefined keyword for the textual information that is obtained from the image recognition if the keyword set includes a plurality of different predefined keywords) to determine whether the textual information that is obtained from the image recognition includes information that matches with a predefined keyword of the keyword set. In response to a search result indicating that information of a predefined keyword of the keyword set does not exist in the textual information that is obtained from the image recognition, a determination is made that the notification message does not include the predefined keyword. In response to a search result indicating that information of a predefined keyword of the keyword set exists in the textual information that is obtained from the image recognition, the present embodiment continues to determine whether the application property information that is obtained satisfies predefined application property condition(s) corresponding to the predefined keyword that is included in the notification message. If the obtained application property information satisfies the predefined application property condition(s) corresponding to the predefined keyword that is included in the notification message, a determination can be made that the notification message that is detected includes the predefined keyword and the application property information of the application to which the notification message belongs satisfies the predefined application property condition(s). Otherwise, a determination can be made that the detected notification message includes the predefined keyword and the application property information of the application to which the notification message belongs fails to satisfy the predefined application property condition(s). For a more specific example, a keyword set is set to include a predefined keyword "red pocket", and a predefined application property condition corresponding to this predefined keyword "red pocket" is an application packet name being "com.tencent.mm" (i.e., a WeChat packet name that is officially defined by WebChat). After obtaining information content of a notification message and application property information of an application to which the notification message belongs through an interface of an auxiliary function of an operating system of a smart electronic device, and when the information content of the notification message includes a picture (such as all the information content of the notification message is the picture), the present embodiment first performs image recognition on the picture in the notification message to convert the notification message into textual information. Matching and searching of the textual information that is obtained from the image recognition are then performed according to the predefined keyword "red pocket" to determine whether information matching with the "red pocket" exists in the textual information that is obtained from the image recognition. In response to a search result indicating that no information matching with the keyword "red pocket" exists in the textual information that is obtained from the image recognition, a determination is made that the notification message does not include the predefined keyword "red pocket". In response to a search result indicating that the information matching with the predefined keyword "red pocket" exists in the textual information that is obtained from the image recognition, the present embodiment further determines whether an application packet name of an application to which the notification message belongs is "com.tencent.mm". If the application packet name of the application to which the notification message belongs is "com.tencent.mm", a determination is made that the notification message including "red pocket" is detected, and the application property information of the application to which the notification message belongs satisfies the predefined application property condition. Otherwise, a determination is made that the application property information of the application to which the notification message belongs does not satisfy the predefined application property condition even though the notification message including "red pocket" is detected.

As a third example, details of the present embodiment of monitoring the notification message of the application through the interface of the auxiliary function of the operating system of the smart electronic device may include monitoring information content of the notification message of the application and message property information of the notification message through the interface of the auxiliary function of the operating system of the smart electronic device. For example, monitoring is performed on a notification message of an application as to whether information content thereof includes a predefined keyword of a keyword set and whether message property information of the notification message satisfies predefined condition(s) (the predefined condition(s) can be called as predefined message property condition(s)) through an interface of an auxiliary function of a smart electronic device. In implementations, the message property information may include one or both of a time of information (e.g., a time of sending the message or a time of receiving the message, etc.), and information about a message sending party. In implementations, the predefined message property condition(s) is/are generally set in conjunction with predefined keyword(s). Furthermore, in a normal situation, a single predefined keyword may be configured with and correspond to a single predefined message property condition. In a real application, however, the present embodiment does not exclude situations in which a single predefined keyword is configured with and correspond to multiple predefined message property conditions. Moreover, in implementations, a predefined message property condition can be a predefined message property condition downloaded from a cloud server (such as updating predefined message property conditions that are local to a smart electronic device from the cloud server regularly or irregularly), or a predefined message property condition that is self-defined by a smart electronic device (i.e., a user of the smart electronic device can set a predefined message property condition on his/her own). The present embodiment can flexibly set up predefined message property conditions based on content included in message property information according to an actual need. Examples of how to individually set up predefined message property conditions based on content of message property information are not described in detail herein.

Details of an implementation of the above third example are given. The present embodiment obtains information content of a notification message and message property information of the notification message through an interface of an auxiliary function of an operating system of a smart electronic device. When the information content of the notification message includes textual information (such as all the information content of the notification message is textual information), the present embodiment matches and searches the textual information of the notification message for a predefined keyword in a locally stored keyword set (when the keyword set includes a plurality of different predefined keywords, the present embodiment can separately matches and searches the textual information of the notification message for each predefined keyword), to determine whether information matching with the predefined keyword in the keyword set exists in the textual information of the notification message. When a search result indicates that no information matching with a predefined keyword in the keyword set exists in the textual information of the notification message, a determination is made that the notification message does not includes a predefined keyword. When a search result indicates that information matching with a predefined keyword in the keyword set exists in the textual information of the notification message, the present embodiment continues to determine whether the message property information that is obtained satisfies predefined message property condition(s) corresponding to the predefined keyword that is included in the notification message. If the obtained message property information satisfies the predefined message property condition(s) corresponding to the predefined keyword that is included in the notification message, a determination can be made that the detected notification message includes the predefined keyword and the message property information of the notification message satisfies the predefined message property condition(s). Otherwise, a determination can be made that the detected notification message includes the predefined keyword and the message property information of the notification message fails to satisfy the predefined message property condition(s). For a more specific example, a keyword set is set to include a predefined keyword "train ticket", and message property conditions corresponding to this predefined keyword "train ticket" are a number segment of a message sending party belonging to a predefined number segment and a time of sending the notification message belonging to a peak time period of ticket ordering (such as a period of time before and after a holiday). After obtaining information content of a notification message and message property information of the notification message through an interface of an auxiliary function of an operating system of a smart electronic device, and when the information content of the notification message includes textual information (such as all the information content of the notification message is textual information), the present embodiment matches and searches the textual information of the notification message according to the predefined keyword "train ticket", to determine whether information matching with "train ticket" exists in the textual information of the notification message. When a search result indicates that the textual information of the notification message does not include information matching with the predefined keyword "train ticket", a determination is made that the notification message does not include the predefined keyword "train ticket". When a search result indicates that the textual information of the notification message includes information matching with the predefined keyword "train ticket", the present embodiment further determines whether a number segment of a message sending party of the notification message belongs to a predefined number segment that is locally stored and whether a message sending time of the notification message belongs to a peak time period of ticket ordering (a predefined number segment that is locally stored and a peak time period of ticket ordering can be downloaded from a cloud server, or may be configured by a user on his/her own). If the number segment of the message sending party of the notification message belongs to the predefined number segment that is locally stored and the message sending time of the notification message belongs to the peak time period of ticket ordering, a determination is made that the notification message including "train ticket" is detected, and the message property information of the notification message satisfies the predefined message property condition. Otherwise, a determination is made that the message property information of the notification message belongs does not satisfy the predefined message property information even though the notification message including "train ticket" is detected.

Details of another implementation of the above third example are given. The present embodiment obtains information content of a notification message and message property information of the notification message through an interface of an auxiliary function of an operating system of a smart electronic device. When the information content of the notification message includes a picture (such as all or part of the information content of the notification message is picture(s)), the present embodiment can first perform image recognition on the picture in the notification message to convert the picture in the notification message into textual information. The present embodiment then performs matching of the textual information that is obtained from the image recognition according to predefined keyword(s) of a locally stored keyword set (the present embodiment can separately perform matching and querying of each predefined keyword for the textual information that is obtained from the image recognition if the keyword set includes a plurality of different predefined keywords) to determine whether the textual information that is obtained from the image recognition includes information that matches with a predefined keyword of the keyword set. In response to a search result indicating that information of a predefined keyword of the keyword set does not exist in the textual information that is obtained from the image recognition, a determination is made that the notification message does not include the predefined keyword. In response to a search result indicating that information of a predefined keyword of the keyword set exists in the textual information that is obtained from the image recognition, the present embodiment continues to determine whether the message property information that is obtained satisfies predefined message property condition(s) corresponding to the predefined keyword that is included in the notification message. If the obtained message property information satisfies the predefined message property condition(s) corresponding to the predefined keyword that is included in the notification message, a determination can be made that the notification message that is detected includes the predefined keyword and the message property information of the notification message satisfies the predefined message property condition(s). Otherwise, a determination can be made that the detected notification message includes the predefined keyword and the message property information of the notification message fails to satisfy the predefined message property condition(s). For a more specific example, a keyword set is set to include a predefined keyword "train ticket", and message property conditions corresponding to this predefined keyword "train ticket" are a number segment of a message sending party belonging to a predefined number segment and a time of sending the notification message belonging to a peak time period of ticket ordering (such as a period of time before and after a holiday). After obtaining information content of a notification message and message property information of the notification message through an interface of an auxiliary function of an operating system of a smart electronic device, and when the information content of the notification message includes a picture (such as all the information content of the notification message is the picture), the present embodiment first performs image recognition on the picture in the notification message to convert the notification message into textual information. Matching and searching of the textual information that is obtained from the image recognition are then performed according to the predefined keyword "train ticket" to determine whether information matching with the "train ticket" exists in the textual information that is obtained from the image recognition. In response to a search result indicating that no information matching with the keyword "train ticket" exists in the textual information that is obtained from the image recognition, a determination is made that the notification message does not include the predefined keyword "train ticket". In response to a search result indicating that the information matching with the predefined keyword "train ticket" exists in the textual information that is obtained from the image recognition, the present embodiment further determines whether a number segment of a message sending party of the notification message belongs to a predefined number segment that is locally stored and whether a message sending time of the notification message belongs to a peak time period of ticket ordering (a predefined number segment that is locally stored and a peak time period of ticket ordering can be downloaded from a cloud server, or may be configured by a user on his/her own). If the number segment of the message sending party of the notification message belongs to the predefined number segment that is locally stored and the message sending time of the notification message belongs to the peak time period of ticket ordering, a determination is made that the notification message including "train ticket" is detected, and the message property information of the notification message satisfies the predefined message property condition. Otherwise, a determination is made that the message property information of the notification message belongs does not satisfy the predefined message property information even though the notification message including "train ticket" is detected.

As a fourth example, details of the present embodiment of monitoring the notification message of the application through the interface of the auxiliary function of the operating system of the smart electronic device may include monitoring information content of the notification message of the application, application property information of the application to which the notification message belongs, and message property information of the notification message, through the interface of the auxiliary function of the operating system of the smart electronic device. For example, based on the interface of the auxiliary function of the operating system of the smart electronic device, a detection is made as to whether the information content of the notification message includes a predefined keyword of a keyword set, and whether the application property information of the application to which the notification message belongs and the message property information of the notification message satisfy respective predefined conditions. The predefined application property condition(s) and the predefined message property condition(s) as described above can form the predefined conditions in implementations. Details of implementations of the fourth example can be made from a combination of the details of implementations of the second example and the details of implementations of the third example, and a detailed process of implementation thereof is not repeatedly described in detail herein.

S104 performs, in response to detecting that the notification message includes a predefined keyword, corresponding processing on the notification message that includes the predefined keyword according to a processing method corresponding to the predefined keyword.

Specifically, the present embodiment can configure a processing method of a notification message for a predefined keyword (a predefined keyword and a corresponding processing method of a notification message can form a notification message processing rule). Therefore, when a notification message including a predefined keyword is detected, the present embodiment can directly employ a processing method of the notification message corresponding to the keyword included in the notification message to perform corresponding processing on the notification message. In other words, a processing method of a notification message in a corresponding notification message processing rule is directly employed for performing corresponding processing on the notification message.

The present embodiment can also configure a processing method of a notification message for a predefined keyword and a corresponding predefined application property condition (a predefined keyword, a predefined application property condition corresponding to the predefined keyword, and a corresponding processing method of a notification message can form a notification message processing rule). Therefore, in response to detecting that a notification message includes a predefined keyword and application property information of an application to which the notification message belongs satisfies a predefined application property condition, corresponding processing is performed on the notification message using a processing method of the notification message corresponding to both the keyword that is included in the notification message and the predefined message property condition that is satisfied. In other words, a processing method of a notification message in a corresponding notification message processing rule is employed for performing corresponding processing on the notification message.

The present embodiment can also configure a processing method of a notification message for a predefined keyword and a corresponding predefined message property condition (a predefined keyword, a predefined message property condition corresponding to the predefined keyword, and a corresponding processing method of a notification message can form a notification message processing rule). Therefore, in response to detecting that a notification message includes a predefined keyword and message property information of the notification message satisfies a predefined message property condition, corresponding processing is performed on the notification message using a processing method of the notification message corresponding to both the keyword that is included in the notification message and the predefined message property condition that is satisfied. In other words, a processing method of a notification message in a corresponding notification message processing rule is employed for performing corresponding processing on the notification message.

The present embodiment can also configure a processing method of a notification message (a predefined keyword, a predefined application property condition corresponding to the predefined keyword, a predefined message property condition corresponding to the predefined keyword, and a corresponding processing method of a notification message can form a notification message processing rule) for a predefined keyword and corresponding predefined conditions (which include a predefined application property condition and a predefined message property condition). Therefore, in response to detecting that a notification message includes a predefined keyword, and application property information of an application to which the notification message belongs satisfies a predefined application property condition, message property information of the notification message satisfies a predefined message property condition, corresponding processing is performed on the notification message using a processing method of the notification message corresponding to both the keyword that is included in the notification message and the predefined property conditions that are satisfied. In other words, a processing method of a notification message in a corresponding notification message processing rule is employed for performing corresponding processing on the notification message.

In implementations, performing corresponding processing for a notification message that includes a predefined keyword can be performing enhanced prompting for the notification message. For example, information content of a notification message can be displayed in a form of a popup window (such as displaying a popup window having a red pocket). For another example, a user is prompted by playing a corresponding audio signal and/or generating vibration.

In implementations, performing corresponding processing for a notification message that includes a predefined keyword can be providing a warning prompt for the notification message. For example, warning information is displayed in a form of a popup window. For another example, a user is warned by playing a corresponding audio signal and/or generating vibration.

In implementations, performing corresponding processing for a notification message that includes a predefined keyword can also be targeted for the notification message. An application to which a notification message belongs is invoked based on an interface of an auxiliary function of an operating system of a smart electronic device, thereby simulating operations performed by a user, e.g., opening the notification message in the application to which the notification message belongs through the interface of the auxiliary function. Specifically, the present embodiment can open a WeChat red pocket in a WeChat application through an interface of an auxiliary function. The present embodiment can also open a dialing interface of a telephone application through an interface of an auxiliary function, and can even simulate a dialing operation of a user based on a telephone number configured in a notification message processing rule. The present embodiment can also delete a notification message associated with a fraud train ticket through an interface of an auxiliary function. The present embodiment does not have any limitation of specifics of corresponding processing methods for performing corresponding processing on a notification message that includes a predefined keyword.

On a basis of whether a notification message that is detected includes a predefined keyword, the present embodiment detects whether application property information of an application to which the notification message belongs and/or message property information of the notification message satisfy predefined conditions, and can effectively avoid incorrect processing operations for disguised/deceitful notification messages that include a predefined keyword, such as deceitful notification messages including a fake "red pocket". In response to determining that an application packet name of an application to which the notification message belongs is not "com.tencent.mm", the present embodiment does not perform enhanced prompting for the notification message, thus avoiding an incorrect prompt for the deceitful notification message that includes the predefined keyword "red pocket". For another example of a deceitful notification message that is associated with maliciously and deceitfully selling train tickets, the present embodiment does not perform enhanced prompting for the notification message in response to determining that a number segment of a sending party of the notification message belongs to a number segment of fraud numbers that are known, thus avoiding an incorrect prompt for the deceitful notification message that includes a predefined keyword "train ticket".

Figure 2:
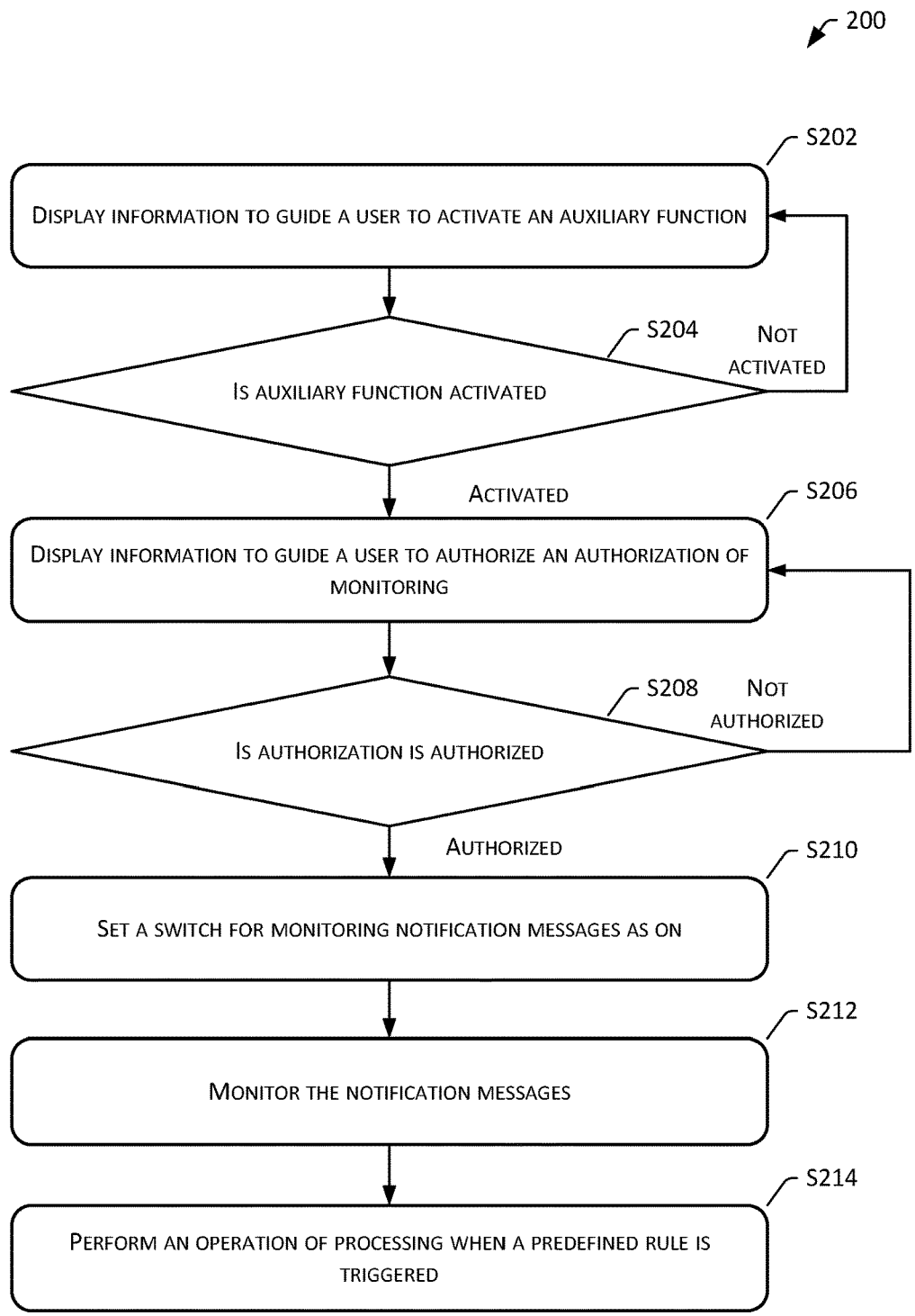
FIG. 2 is a flowchart of a method of processing a notification message in accordance with a second embodiment of the present disclosure.

Second Embodiment: An Implementation Method of Processing a Notification Message FIG. 2 is a flowchart of a method 200 of processing a notification message in accordance with the present embodiment. Each operation in FIG. 2 is described in detail hereinafter.

S202 displays corresponding description information in a user interface of a smart electronic device, to guide a user to enter into an interface of an auxiliary function of an operating system for activating the auxiliary function.

S204 determines whether the auxiliary function of the operating system is activated. If the auxiliary function is activated, S208 is entered. Otherwise, S202 is returned to continue to guide the user to enter into the interface of the auxiliary function of the operating system.

S206 displays corresponding description information on the user interface of the smart electronic device to guide the user to allow monitoring of notification messages of application(s), i.e., the user authorizing an authorization of monitoring the notification messages of the application(s).

S208 determines whether the user authorize an authorization of monitoring the notification messages of the application(s). If an authorization of monitoring the notification messages of the application(s) is authorized, S210 is entered. Otherwise, S206 is returned to continue to guide the user to authorize an authorization of monitoring the notification messages of the application(s).

S210 sets a switch for monitoring the notification messages of the application(s) as on.

S212 monitors the notification messages of the application(s) through the interface of the auxiliary function of the operating system. For example, information content of the notification messages of the application(s) is monitored. For another example, the information content of the notification messages of the application(s) and application property information of the application(s) to which the notification messages is monitored. For another example, the information content of the notification messages of the application (s), the application property information of the application (s) to which the notification messages, and message property information of the notification messages is monitored.

When a monitored notification message triggers a notification message processing rule that is configured in advance, S214 is entered. When a monitored notification message does not trigger any notification message processing rule that is configured in advance, an operation of monitoring the notification messages of the application(s) through the interface of the auxiliary function of the operating system is continued to be performed.

The notification message processing rule may specifically include a predefined keyword and a processing method of a notification message. For this type of notification message processing rule, when information content of a monitored notification message includes a predefined keyword in a notification message processing rule, such notification message processing rule is triggered.

The notification message processing rule may specifically include a predefined keyword, a predefined condition that is set up for application property information of an application to which a notification message belongs, and a processing method of the notification message. For this type of notification message processing rule, when information content of a monitored notification message includes a predefined keyword in a notification message processing rule, and application property information of an application to which the notification message belongs satisfies a predefined condition, such notification message processing rule is triggered.

The notification message processing rule may specifically include a predefined keyword, a predefined condition that is set up for message property information of a notification message, and a processing method of the notification message. For this type of notification message processing rule, when information content of a monitored notification message includes a predefined keyword in a notification message processing rule, and message property information of the notification message satisfies a predefined condition, such notification message processing rule is triggered.

The notification message processing rule may specifically include a predefined keyword, predefined conditions that are set up for application property information of an application to which a notification message belongs and message property information of the notification message, and a processing method of the notification message. For this type of notification message processing rule, when information content of a monitored notification message includes a predefined keyword in a notification message processing rule, and application property information of an application to which the notification message and message property information of the notification message belongs satisfy respective predefined conditions, such notification message processing rule is triggered.

S214 performs corresponding processing on a notification message according to a processing method of the notification message in a notification message processing rule that is triggered by the notification message, such as opening the notification message through the application to which the notification message belongs, or popping up an enhanced prompt window that is set for the notification message through an Ali money shield application, etc. The present embodiment does not limit specific ways of implementations for performing corresponding processing on a notification message.

Figure 3:
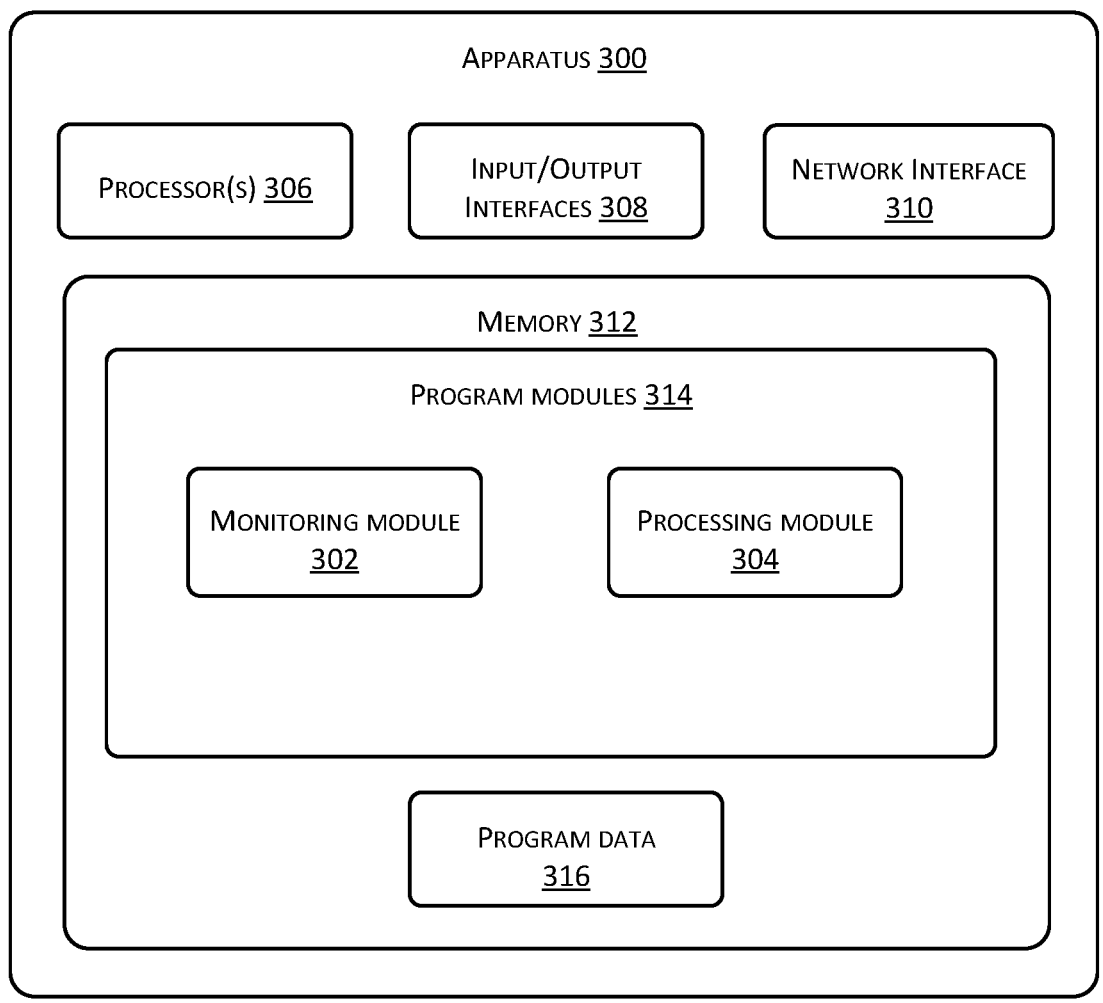
FIG. 3 is a schematic structural diagram of an apparatus of processing a notification message in accordance with a third embodiment of the present disclosure.

Third Embodiment: An Implementation of an Apparatus of Processing a Notification Message In implementations, FIG. 3 shows an apparatus 300 that implements processing of a notification message which is generally deployed in a smart electronic device, such as being deployed in a smart electronic device having an Android-based operating system. If other operating systems also provide an interface of an auxiliary function, the apparatus of the present embodiment can also be deployed in smart electronic devices having these other operating systems. Structures of implementations of an apparatus of processing a notification message in accordance with the present embodiment are shown in FIGS. 3-9.

In implementations, the apparatus 300 may include one or more computing devices. In implementations, the apparatus 300 may be a part of one or more computing devices, e.g., run or implemented by the one or more computing devices. The one or more computing devices may be located in a single place or distributed among a plurality of network devices connected through a network, e.g., a cloud. By way of example and not limitation, as shown in FIG. 3, the apparatus 300 may include a monitoring module 302 and a processing module 304.

In implementations, the apparatus 300 may also include one or more processors 306, an input/output (I/O) interface 308, a network interface 310, and memory 312.

The memory 312 may include a form of computer readable media such as a volatile memory, a random access memory (RAM) and/or a non-volatile memory, for example, a read-only memory (ROM) or a flash RAM. The memory 312 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 312 may include program modules 314 and program data 316.

The monitoring module 302 is mainly used for monitoring notification messages of an application through an interface of an auxiliary function of an operating system of a smart electronic device.

Figure 4:
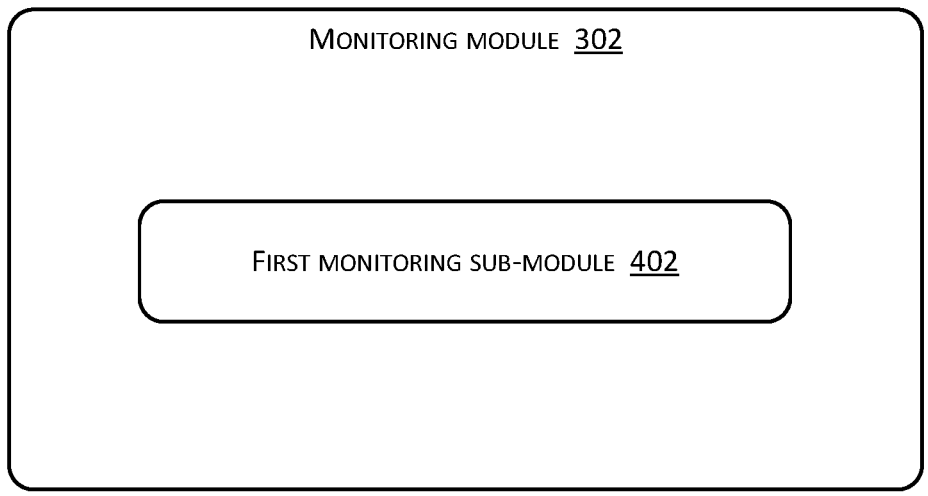
FIG. 4 is a schematic structural diagram of a monitoring module in accordance with the third embodiment of the present disclosure.
Figure 5:
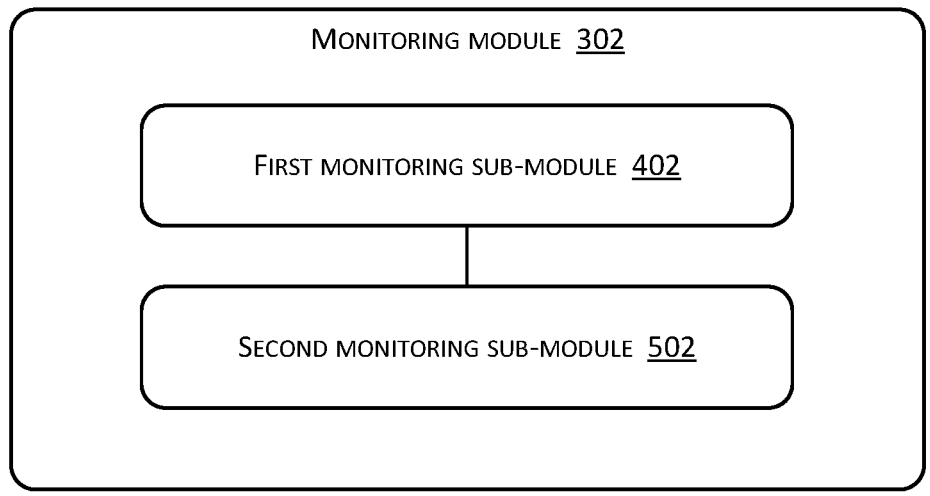
FIG. 5 is a schematic structural diagram of another monitoring module in accordance with the third embodiment of the present disclosure.
Figure 6:
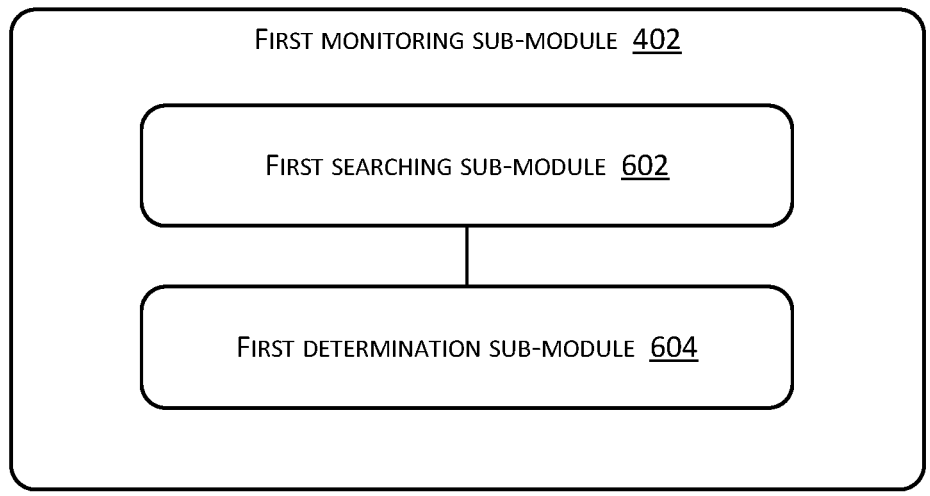
FIG. 6 is a schematic structural diagram of a first monitoring sub-module in accordance with the third embodiment of the present disclosure.
Figure 7:
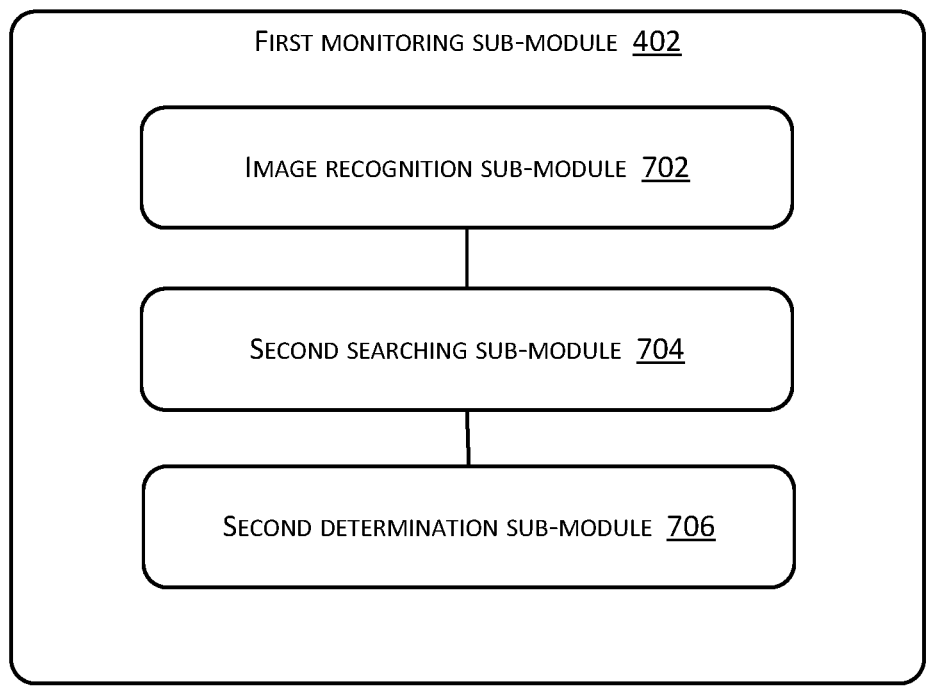
FIG. 7 is a schematic structural diagram of another first monitoring sub-module in accordance with the third embodiment of the present disclosure.

The monitoring module 302 mainly includes a first monitoring sub-module 402 (as shown in FIG. 4). Furthermore, the monitoring module 302 may also include a second monitoring sub-module 502 (as shown in FIG. 5). The first monitoring sub-module 402 may include a first searching sub-module 602 and a first determination sub-module 604 (as shown in FIG. 6). The first monitoring sub-module 402 may also include an image recognition sub-module 702, a second searching sub-module 704, and a second determination sub-module 706 (as shown in FIG. 7).

The first monitoring sub-module 402 is mainly used for detecting whether information content of a notification message includes a predefined keyword of a keyword set through the interface of the auxiliary function of the operating system of the smart electronic device.

The second monitoring sub-module 502 is mainly used for detecting whether application property information of an application to which the notification message belongs and/or message property information of the notification message satisfy respective predefined conditions.

The first searching sub-module 602 is mainly used for querying whether textual information in the information content of the notification message includes the predefined keyword of the keyword set.

The first determination sub-module 604 is mainly used for determining that the notification message including the predefined keyword is detected in response to a query result indicating that the textual information in the information content of the notification message includes the predefined keyword.

The image recognition sub-module 702 is mainly used for performing image recognition on a picture in the information content of the notification message.

The second searching sub-module 704 is mainly used for querying whether an image recognition result includes the predefined keyword of the keyword set.

The second determination sub-module 706 is mainly used for determining that the notification message including the predefined keyword is detected in response to a query result indicating that the image recognition result includes the predefined keyword.

Specifically, in a process of implementation of the present embodiment, if the auxiliary function provided by the operating system of the smart electronic device is not in an activated status, the apparatus implementing notification message processing (such as a configuration module) needs to perform an operation of activating the auxiliary function provided by the operating system of the smart electronic device first. For example, the configuration module enables a user of the smart electronic device to set the auxiliary function provided by the operating system of the smart electronic device to an activated status by guiding the user of the smart electronic device step by step.

As an example, the notification message of the application that is monitored by the monitoring module 302 through the interface of the auxiliary function of the operating system of the smart electronic device may be a notification message of a system application, or may be a notification message of a third-party application. The notification message of a system application may be a notification message of a short messaging application, such as a notification message that is generated after a short messaging application receives a new short message. The notification message of a third-party application may be a notification message of an instant messaging application, such as a notification message that is generated when a WeChat application receives a new message. The notification message of a third-party application may be a notification message of a new message pushed by an application client, such as a notification message that is generated when a Sohu Video client or Tencent news client wants to push new video/news to a user.

As a first example, the first monitoring sub-module 402 can detect whether information content of a notification message includes a predefined keyword of a keyword set through the interface of the auxiliary function of the operating system of the smart electronic device. In implementations, the keyword set generally includes a predefined keyword or a plurality of different predefined keywords. Furthermore, in implementations, the predefined keyword(s) in the keyword set can be predefined keyword(s) that is/are downloaded by the first monitoring sub-module 402 from a cloud server (for example, updating a keyword set that is locally stored in a smart electronic device from a cloud server regularly or irregularly), or predefined keyword(s) that is/are self-defined by a smart electronic device (i.e., the first monitoring sub-module 402 stores predefined keyword(s) that is/are defined by a user of the smart electronic device himself/herself in a keyword set).

Details of an implementation of the first example are given. The first monitoring sub-module 402 may obtain information content of a notification message through an interface of an auxiliary function of an operating system of a smart electronic device. In an event that the information content of the notification message includes textual information (such as the entire information content of the notification message is textual information), the first searching sub-module 602 can perform matching of the textual information of the notification message according to predefined keyword(s) of a locally stored keyword set (the first searching sub-module 602 can separately perform matching and querying of each predefined keyword for the textual information of the notification message if the keyword set includes a plurality of different predefined keywords) to determine whether the textual information of the notification message includes information that matches with a predefined keyword of the keyword set. In response to a search result of the first searching sub-module 602 indicating that information of a predefined keyword of the keyword set exists in the textual information of the notification message, the first determination sub-module 604 determines that a notification message that is detected includes a predefined keyword. Otherwise, the first determination sub-module 604 determines that the notification message does not include a predefined keyword.

Details of another implementation of the first example described above may include the following. The first monitoring sub-module 402 can obtain information content of a notification message through an interface of an auxiliary function of an operating system of a smart electronic device. In an event that the information content of the notification message includes a picture (such as all or part of the information content of the notification message is a picture), the image recognition sub-module 702 can first perform image recognition on the picture in the notification message to convert the picture in the notification message into textual information. The second searching sub-module 704 then performs matching of the textual information that is obtained from the image recognition according to predefined keyword(s) of a locally stored keyword set (the second searching sub-module 704 can separately perform matching and querying of each predefined keyword for the textual information that is obtained from the image recognition if the keyword set includes a plurality of different predefined keywords) to determine whether the textual information that is obtained from the image recognition includes information that matches with a predefined keyword of the keyword set. In response to a search result of the second searching sub-module 704 indicating that information of a predefined keyword of the keyword set exists in the textual information that is obtained from the image recognition, the second determination sub-module 706 determines that a notification message that is detected includes a predefined keyword. Otherwise, the second determination sub-module 706 determines that the notification message does not include a predefined keyword.

As a second example, the first monitoring sub-module 402 and the second monitoring sub-module 502 monitor the information content of the notification message of the application and the application property information of the application to which the notification message belongs through the interface of the auxiliary function of the operating system of the smart electronic device. For example, the first monitoring sub-module 402 detects whether information content of a notification message includes a predefined keyword of a keyword set through an interface of an auxiliary function of a smart electronic device, and the second monitoring sub-module 502 detects whether application property information of an application to which the notification message belongs satisfies predefined condition(s) (the predefined condition(s) can be called as predefined application property condition(s)). In implementations, application property information may include any one or more of a packet name of an application, a name of the application, a type of the application (such as a system application or a third-party application), a space occupied by the application after installation, and memory occupied by the application after launch. In implementations, a predefined application property condition is generated set in conjunction with a predefined keyword. Furthermore, in a normal situation, a single predefined keyword may be configured with and correspond to a single predefined application property condition. In a real application, however, the present embodiment does not exclude situations in which a single predefined keyword is configured with and correspond to multiple predefined application property conditions. Moreover, in implementations, a predefined application property condition can be a predefined application property condition that is downloaded by the second monitoring sub-module 502 from a cloud server (such as updating predefined application property conditions that are local to a smart electronic device from the cloud server regularly or irregularly), or a predefined application property condition that is self-defined by a smart electronic device (i.e., second monitoring sub-module 502 allows a user of the smart electronic device to set a predefined application property condition on his/her own).

Specific operations performed by the second monitoring sub-module 502 are similar to the two implementations of the second example, the third example, the two implementations of the third example, and the fourth example in the first embodiment as described above, and are not repeatedly described in detail herein.

The processing module 304 is mainly used for performing corresponding processing on a notification message including a predefined keyword according to a processing method corresponding to the predefined keyword in response to the monitoring module 302 detects the notification message including the predefined keyword.

Figure 8:
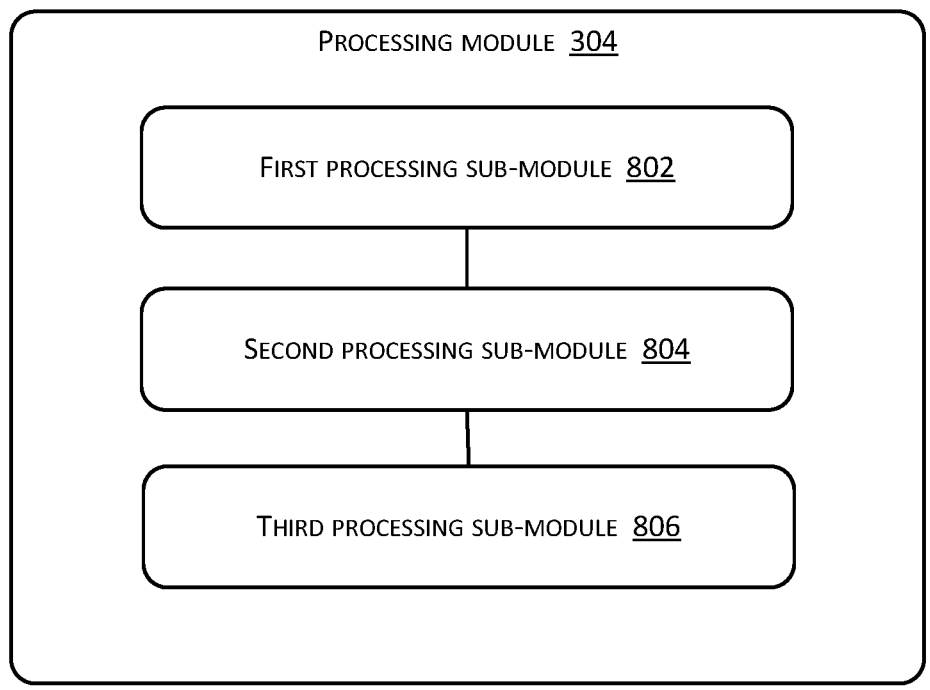
FIG. 8 is a schematic structural diagram of a processing module in accordance with the third embodiment of the present disclosure.
Figure 9:
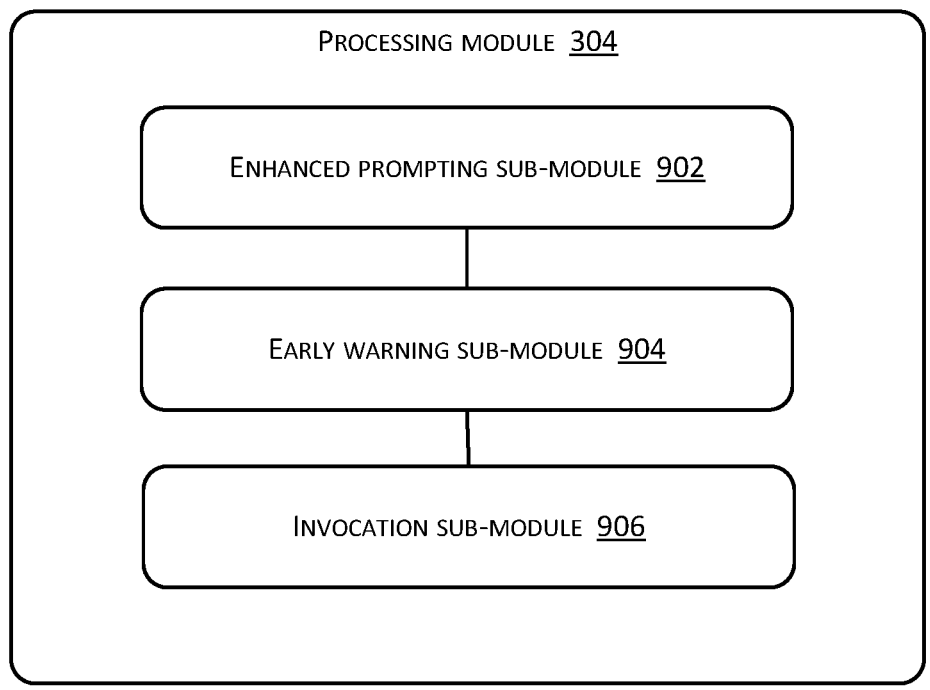
FIG. 9 is a schematic structural diagram of another processing module in accordance with the third embodiment of the present disclosure.

The processing module 304 mainly includes one or more of a first processing sub-module 802, a second processing sub-module 804, and a third processing sub-module 806 (as shown in FIG. 8). Furthermore, the processing module 304 may also mainly include an enhanced prompting sub-module 902, an early warning sub-module 904, and an invocation sub-module 906 (as shown in FIG. 9). In a specific real application, the first processing sub-module 802, the second processing sub-module 804, and the third processing sub-module 806 all include the enhanced prompting sub-module 902, the early warning sub-module 904, and the invocation sub-module 906.

The first processing sub-module 802 is mainly used for performing corresponding processing on the notification message including the predefined keyword according to a processing method corresponding to the predefined keyword and the predefined condition when the notification message includes the predefined keyword and application property information satisfies the predefined condition.

The second processing sub-module 804 is mainly used for performing corresponding processing on the notification message including the predefined keyword according to a processing method corresponding to the predefined keyword and the predefined condition when the notification message includes the predefined keyword and message property information satisfies the predefined condition.

The third processing sub-module 806 is mainly used for performing corresponding processing on the notification message including the predefined keyword according to a processing method corresponding to the predefined keyword and the predefined condition when the notification message includes the predefined keyword, and application property information and message property information satisfies the predefined condition.

The enhanced prompting sub-module 902 is mainly used for performing enhanced prompting for the notification information.

The early warning sub-module 904 is mainly used for providing an early warning for the notification information.

The invocation sub-module 906 is mainly used for invoking the application to which the notification message belongs for the notification message through the interface of the auxiliary function of the operating system of the smart electronic device.

Specifically, the processing module 304 can configure a processing method of a notification message for a predefined keyword (a predefined keyword and a corresponding processing method of a notification message can form a notification message processing rule). Therefore, when a notification message including a predefined keyword is detected by the monitoring module 302, the processing module 304 can directly employ a processing method of the notification message corresponding to the keyword included in the notification message to perform corresponding processing on the notification message. In other words, the processing module 304 can directly employ a processing method of a notification message in a corresponding notification message processing rule for performing corresponding processing on the notification message.

The processing module 304 can also configure a processing method of a notification message for a predefined keyword and a corresponding predefined application property condition (a predefined keyword, a predefined application property condition corresponding to the predefined keyword, and a corresponding processing method of a notification message can form a notification message processing rule). Therefore, in response to the monitoring module 302 detecting that a notification message includes a predefined keyword and application property information of an application to which the notification message belongs satisfies a predefined application property condition, the first processing sub-module 802 can perform corresponding processing on the notification message by employing a processing method of the notification message corresponding to both the keyword that is included in the notification message and the predefined message property condition that is satisfied. In other words, the first processing sub-module 802 employs a processing method of a notification message in a corresponding notification message processing rule for performing corresponding processing on the notification message.

The processing module 304 can also configure a processing method of a notification message for a predefined keyword and a corresponding predefined message property condition (a predefined keyword, a predefined message property condition corresponding to the predefined keyword, and a corresponding processing method of a notification message can form a notification message processing rule). Therefore, in response to the monitoring module 302 detecting that a notification message includes a predefined keyword and message property information of the notification message satisfies a predefined message property condition, the second processing sub-module 804 can perform corresponding processing on the notification message by using a processing method of the notification message corresponding to both the keyword that is included in the notification message and the predefined message property condition that is satisfied. In other words, the second processing sub-module 804 employs a processing method of a notification message in a corresponding notification message processing rule for performing corresponding processing on the notification message.

The processing module 304 can also configure a processing method of a notification message (a predefined keyword, a predefined application property condition corresponding to the predefined keyword, a predefined message property condition corresponding to the predefined keyword, and a corresponding processing method of a notification message can form a notification message processing rule) for a predefined keyword and corresponding predefined conditions (which include a predefined application property condition and a predefined message property condition). Therefore, in response to the monitoring module 302 detecting that a notification message includes a predefined keyword, and application property information of an application to which the notification message belongs satisfies a predefined application property condition, message property information of the notification message satisfies a predefined message property condition, the third processing sub-module 806 can perform corresponding processing on the notification message by using a processing method of the notification message corresponding to both the keyword that is included in the notification message and the predefined property conditions that are satisfied. In other words, the third processing sub-module 806 employs a processing method of a notification message in a corresponding notification message processing rule for performing corresponding processing on the notification message.

Corresponding processing that is performed for a notification message that includes a predefined keyword by the processing module 304 can be performing enhanced prompting for the notification message by the enhanced prompting sub-module 902. For example, the enhanced prompting sub-module 902 displays information content of a notification message in a form of a popup window (such as the enhanced prompting sub-module 902 displays a popup window having a red pocket). For another example, the enhanced prompting sub-module 902 prompts a user by playing a corresponding audio signal and/or generating vibration.

Corresponding processing that is performed for a notification message that includes a predefined keyword by the processing module 304 can be providing a warning prompt for the notification message. For example, the early warning sub-module 902 displays warning information in a form of a popup window. For another example, the early warning sub-module 902 warns a user by playing a corresponding audio signal and/or generating vibration.

Corresponding processing that is performed for a notification message that includes a predefined keyword by the processing module 304 can also be the invocation sub-module 906 targeted for the notification message. An application to which a notification message belongs is invoked based on an interface of an auxiliary function of an operating system of a smart electronic device, thereby simulating operations performed by a user, e.g., invoking the invocation module 906 to open the notification message in the application to which the notification message belongs through the interface of the auxiliary function. Specifically, the invocation module 906 can open a WeChat red pocket in a WeChat application through an interface of an auxiliary function. The invocation module 906 can also open a dialing interface of a telephone application through an interface of an auxiliary function. The invocation module 906 can even simulate a dialing operation of a user based on a telephone number configured in a notification message processing rule. The invocation module 906 can also delete a notification message associated with a fraud train ticket through an interface of an auxiliary function. The present embodiment does not have any limitation on specifics of corresponding processing methods used by the invocation module 906 for performing corresponding processing on a notification message that includes a predefined keyword.

It should be noted that a portion of the present disclosure can be applied as a computer program product, such as computer program instructions that, when executed by a smart electronic device (such as a smart mobile phone or a tablet computer), can call or provide a method and/or a technical solution according to the present disclosure through operations of the smart electronic device. The program instructions that call the method of the present disclosure may be stored in a fixed or movable recording media, and/or transmitted through broadcasting or a data stream in other signal carrier media, and/or stored in a work storage device of a smart electronic device that runs according to the program instructions. According to an embodiment of the present disclosure, an apparatus is included herein. The apparatus includes a storage device storing computer program instructions, and processor(s) executing the program instructions. When the computer program instructions are executed by the processor(s), the apparatus is triggered to run the method(s) and/or technical solution(s) according to the foregoing embodiments of the present disclosure.

For one skilled in the art, the present disclosure is apparently not limited to the details of the exemplary embodiments that are described above, and the present disclosure can be implemented in other forms without departing the spirit and basic features of the present disclosure. Therefore, regardless of which point of view, the embodiments are all considered as exemplary description, and not limiting description. The scope of the present disclosure is defined by the appended claims, and not limited by the above specification. Accordingly, implications of equivalent elements of the claims and all modifications that fall within the scope are intended to be covered in the present disclosure. No accompanying label in a claim should be treated as limiting the claim that is involved. Furthermore, a term "include" apparently does not exclude other units or steps, and a singular form does not exclude a plural form. Multiple units or apparatuses recited in a system claim can also be implemented by a single unit or apparatus through software or hardware. Terms such as first and second are used for representing names, and do not represent any specific order.

The present disclosure can further be understood using the following clauses.

Clause 1: A method of processing a notification message, comprising: monitoring a notification message of an application through an interface of an auxiliary function of an operating system of a smart electronic device; and in response to detecting that the notification message includes a predefined keyword, performing corresponding processing on the notification message that includes the predefined keyword according to a processing method corresponding to the predefined keyword.

Clause 2: The method of Clause 1, wherein the notification message of the application comprises a notification message of a system application, or a notification message of a third-party application.

Clause 3: The method of Clause 2, wherein: the notification message of the system application includes a notification message of a new message received by a short messaging application; and the notification message of the third-party application includes a notification message of new information received by an instant messaging application or a notification message of new information pushed by an application client.

Clause 4: The method of Clause 1, wherein monitoring the notification message of the application through the interface of the auxiliary function of the operating system of the smart electronic device comprises detecting whether information content of the notification message of the application includes the predefined keyword in a keyword set through the interface of the auxiliary function of the operating system of the smart electronic device.

Clause 5: The method of Clause 4, wherein detecting whether the information content of the notification message of the application includes the predefined keyword in the keyword set through the interface of the auxiliary function of the operating system of the smart electronic device comprises: querying whether textual information in the information content of the notification message includes the predefined keyword in the keyword set; and determining that the notification message that includes the predefined keyword is detected in response to a query result indicating that the textual information in the information content includes the predefined keyword.

Clause 6: The method of Clause 4, wherein detecting whether the information content of the notification message of the application includes the predefined keyword in the keyword set through the interface of the auxiliary function of the operating system of the smart electronic device comprises: performing an image recognition on a picture in the information content of the notification message; querying whether an image recognition result includes the predefined keyword in the keyword set; and determining that the notification message that includes the predefined keyword is detected in response to a query result indicating that the image recognition result includes the predefined keyword.

Clause 7: The method of any one of Clauses 4-6, wherein the predefined keyword included in the keyword set comprises a predefined keyword that is downloaded from a cloud server and/or a predefined keyword that is self-defined by the smart electronic device.

Clause 8: The method of any one of Clauses 4-6, wherein monitoring the notification message of the application through the interface of the auxiliary function of the operating system of the smart electronic device further comprises detecting whether application property information of the application to which the notification message belongs and/or message property information of the notification message satisf(ies) respective predefined condition(s).

Clause 9: The method of Clause 8, wherein the application property information comprises one or more of a packet name of the application, a name of the application, a type of the application, a space occupied by the application after installation, and memory occupied by the application after being activated.

Clause 10: The method of Clause 8, wherein the message property information comprises one or more of a message time and a message sending party information.

Clause 11: The method of Clause 8, wherein: in response to detecting that the notification message includes the predefined keyword, performing the corresponding processing on the notification message that includes the predefined keyword according to the processing method corresponding to the predefined keyword comprises: in response to detecting that the notification message includes the predefined keyword and the application property information satisfies a predefined condition, performing the corresponding processing on the notification message that includes the predefined keyword according to the processing method corresponding to the predefined keyword and the predefined condition; in response to detecting that the notification message includes the predefined keyword and the message property information satisfies a predefined condition, performing the corresponding processing on the notification message that includes the predefined keyword according to the processing method corresponding to the predefined keyword the predefined condition; or in response to detecting that the notification message includes the predefined keyword, and the application property information and the message property information satisfy respective predefined conditions, performing the corresponding processing on the notification message that includes the predefined keyword according to the processing method corresponding to the predefined keyword and the respective predefined conditions.

Clause 12: The method of Clause 1, wherein the corresponding processing performed for the notification message that includes the predefined keyword comprises at least one of: performing enhanced prompting for the notification message; providing an early warning for the notification message; and invoking the application to which the notification message belongs for the notification message using the interface of the auxiliary function of the operating system of the smart electronic device.

Clause 13: An apparatus of implementing notification message processing, wherein the apparatus comprises: a monitoring module used for monitoring a notification message of an application through an interface of an auxiliary function of an operating system of a smart electronic device; and a processing module used for, in response to detecting that the notification message includes a predefined keyword, performing corresponding processing on the notification message that includes the predefined keyword according to a processing method corresponding to the predefined keyword.

Clause 14: The apparatus of Clause 13, wherein the notification message of the application comprises a notification message of a system application, or a notification message of a third-party application.

Clause 15: The apparatus of Clause 14, wherein: the notification message of the system application includes a notification message of a new message received by a short messaging application; and the notification message of the third-party application includes a notification message of new information received by an instant messaging application or a notification message of new information pushed by an application client.

Clause 16: The apparatus of Clause 13, wherein the monitoring module comprises a first monitoring sub-module used for detecting whether information content of the notification message of the application includes the predefined keyword in a keyword set through the interface of the auxiliary function of the operating system of the smart electronic device.

Clause 17: The apparatus of Clause 16, wherein the first monitoring sub-module comprises: a first searching sub-module used for querying whether textual information in the information content of the notification message includes the predefined keyword in the keyword set; and a first determination sub-module used for determining that the notification message that includes the predefined keyword is detected in response to a query result indicating that the textual information in the information content includes the predefined keyword.

Clause 18: The apparatus of Clause 16, wherein the first monitoring sub-module comprises: an image recognition sub-module used for performing an image recognition on a picture in the information content of the notification message; a second searching sub-module used for querying whether an image recognition result includes the predefined keyword in the keyword set; and a second determination sub-module used for determining that the notification message that includes the predefined keyword is detected in response to a query result indicating that the image recognition result includes the predefined keyword.

Clause 19: The apparatus of any one of Clauses 16-18, wherein the predefined keyword included in the keyword set comprises a predefined keyword that is downloaded from a cloud server and/or a predefined keyword that is self-defined by the smart electronic device.

Clause 20: The apparatus of any one of Clauses 16-18, wherein the monitoring module further comprises a second monitoring sub-module used for detecting whether application property information of the application to which the notification message belongs and/or message property information of the notification message satisf(ies) respective predefined condition(s).

Clause 21: The apparatus of Clause 20, wherein the application property information comprises one or more of a packet name of the application, a name of the application, a type of the application, a space occupied by the application after installation, and memory occupied by the application after being activated.

Clause 22: The apparatus of Clause 20, wherein the message property information comprises one or more of a message time and a message sending party information.

Clause 23: The apparatus of Clause 20, wherein the processing module comprises: a first processing sub-module used for, in response to detecting that the notification message includes the predefined keyword and the application property information satisfies a predefined condition, performing the corresponding processing on the notification message that includes the predefined keyword according to the processing method corresponding to the predefined keyword and the predefined condition; a second processing sub-module used for, in response to detecting that the notification message includes the predefined keyword and the message property information satisfies a predefined condition, performing the corresponding processing on the notification message that includes the predefined keyword according to the processing method corresponding to the predefined keyword the predefined condition; or a third processing sub-module used for, in response to detecting that the notification message includes the predefined keyword, and the application property information and the message property information satisfy respective predefined conditions, performing the corresponding processing on the notification message that includes the predefined keyword according to the processing method corresponding to the predefined keyword and the respective predefined conditions.

Clause 24: The apparatus of Clause 13, wherein the processing module comprises at least one of: an enhanced prompting sub-module used for performing enhanced prompting for the notification message; an early warning sub-module used for providing an early warning for the notification message; and an invocation sub-module used for invoking the application to which the notification message belongs for the notification message using the interface of the auxiliary function of the operating system of the smart electronic device.

What is claimed is:

1. A method implemented by an electronic device, the method comprising:
    monitoring a notification message of an application through an interface of an auxiliary function of an operating system of the electronic device;
    detecting, through the interface of the auxiliary function of the operating system of the electronic device:
        that the notification message of the application includes a predefined keyword in a keyword set, and
        whether message property information of the application satisfies a predefined condition, the predefined condition including a time period during which the notification message is generated and information associated with a notification message generating party of the notification message; and in response to detecting that the notification message includes the predefined keyword and the predefined condition is satisfied, performing corresponding processing on the notification message that includes the predefined keyword according to a processing method corresponding to the predefined keyword.

2. The method of claim 1, wherein the notification message of the application comprises a notification message of a system application, or a notification message of a third-party application.

3. The method of claim 2, wherein:
the notification message of the system application includes a notification message of a new message received by a short messaging application; and
the notification message of the third-party application includes a notification message of new information received by an instant messaging application or a notification message of new information pushed by an application client.

4. The method of claim 1, wherein detecting whether that the notification message of the application includes the predefined keyword includes:
performing an image recognition on a picture in information content of the notification message;
converting the recognized image of the picture from the image recognition into image textual information;
querying whether the image textual information includes the predefined keyword in the keyword set; and
determining that the notification message that includes the predefined keyword is detected in response to a query result indicating that the image textual information includes the predefined keyword.

5. The method of claim 1, wherein the predefined keyword included in the keyword set comprises a predefined keyword that is downloaded from a cloud server and/or a predefined keyword that is self-defined by the electronic device.

6. The method of claim 1, wherein detecting, through the interface of the auxiliary function of the operating system of the electronic device includes:
detecting whether application property information of the notification message satisfies the predefined condition.

7. The method of claim 6, wherein the predefined condition further comprises one or more of a name of the application, a type of the application, a space occupied by the application after installation, an application packet name defined by the application and corresponds to the predefined keyword, and memory occupied by the application after being activated.

8. The method of claim 6, wherein: in response to detecting that the notification message includes the predefined keyword, performing the corresponding processing on the notification message that includes the predefined keyword according to the processing method corresponding to the predefined keyword comprises:
in response to detecting that the notification message includes the predefined keyword and the application property information satisfies the predefined condition, performing the corresponding processing on the notification message that includes the predefined keyword according to the processing method corresponding to the predefined keyword and the predefined condition;
in response to detecting that the notification message includes the predefined keyword and the message property information satisfies the predefined condition, performing the corresponding processing on the notification message that includes the predefined keyword according to the processing method corresponding to the predefined keyword the predefined condition; or
in response to detecting that the notification message includes the predefined keyword, and the application property information and the message property information satisfy respective predefined conditions, performing the corresponding processing on the notification message that includes the predefined keyword according to the processing method corresponding to the predefined keyword and the respective predefined conditions.

9. The method of claim 1, wherein the corresponding processing performed for the notification message that includes the predefined keyword comprises at least one of the following:
performing enhanced prompting for the notification message;
providing an early warning for the notification message; and
invoking the application to which the notification message belongs for the notification message using the interface of the auxiliary function of the operating system of the electronic device.

10. An apparatus comprising:
one or more processors; and
memory, storing computer-executable modules, that when executed by the one or more processors, perform associated operations, the computer-executable modules including:
a monitoring module configured to monitor a notification message of an application through an interface of an auxiliary function of an operating system of an electronic device, the monitoring module comprising:
a first monitoring sub-module used for detecting whether information content of the notification message of the application includes a predefined keyword in a keyword set through the interface of the auxiliary function of the operating system of the electronic device, and
a second monitoring sub-module used for detecting whether message property information of the notification message satisfies a predefined condition, the predefined condition including a time period during which the notification message is generated and information associated with a notification message generating party of the notification message; and
a processing module configured to perform, in response to the monitoring sub-module determining that the notification message includes the predefined keyword and the second monitoring sub-module detecting that the predefined condition is satisfied, corresponding processing on the notification message that includes the predefined keyword according to a processing method corresponding to the predefined keyword.

11. The apparatus of claim 10, module further comprises, wherein the first monitoring sub-module includes:
an image recognition sub-module used for performing an image recognition on a picture in information content of the notification message by converting the recognized image of the picture from the image recognition into image textual information;
a second searching sub-module used for querying whether the image textual information includes a predefined keyword in a keyword set; and a second determination sub-module used for determining that the notification message that includes the predefined keyword is detected in response to a query result indicating that the image textual information includes the predefined keyword.

12. The apparatus of claim 11, wherein the first monitoring sub-module further comprises:
a first searching sub-module used for querying whether textual information in the information content of the notification message includes the predefined keyword in the keyword set; and
a first determination sub-module used for determining that the notification message that includes the predefined keyword is detected in response to a query result indicating that the textual information in the information content includes the predefined keyword.

13. The apparatus of claim 10, wherein the second monitoring sub-module is further used for detecting whether application property information of the notification message satisfies the predefined condition, the predefined condition further comprising one or more of a name of the application, a type of the application, a space occupied by the application after installation, an application packet name defined by the application and corresponds to the predefined keyword, and memory occupied by the application after being activated.

14. The apparatus of claim 13, wherein the processing module comprises:
a first processing sub-module used for performing, in response to detecting that the notification message includes the predefined keyword and the application property information satisfies the predefined condition, the corresponding processing on the notification message that includes the predefined keyword according to the processing method corresponding to the predefined keyword and the predefined condition;
a second processing sub-module used for performing, in response to detecting that the notification message includes the predefined keyword and the message property information satisfies the predefined condition, the corresponding processing on the notification message that includes the predefined keyword according to the processing method corresponding to the predefined keyword the predefined condition; or
a third processing sub-module used for performing, in response to detecting that the notification message includes the predefined keyword, and the application property information and the message property information satisfy respective predefined conditions, the corresponding processing on the notification message that includes the predefined keyword according to the processing method corresponding to the predefined keyword and the respective predefined conditions.

15. The apparatus of claim 10, wherein the processing module comprises at least one of:
an enhanced prompting sub-module used for performing enhanced prompting for the notification message;
an early warning sub-module used for providing an early warning for the notification message; and
an invocation sub-module used for invoking the application to which the notification message belongs for the notification message using the interface of the auxiliary function of the operating system of the electronic device.

16. One or more computer readable media storing executable instructions that, when executed by one or more processors, cause the one or more processors of an electronic device to perform acts comprising:
monitoring a notification message of an application through an interface of an auxiliary function of an operating system of the electronic device;
detecting, through the interface of the auxiliary function of the operating system of the electronic device:
that the notification message of the application includes a predefined keyword in a keyword set, and
whether message property information of the application satisfies a predefined condition, the predefined condition including a time period during which the notification message is generated and information associated with a notification message generating party of the notification message; and
in response to detecting that the notification message includes the predefined keyword and the predefined condition is satisfied, performing corresponding processing on the notification message that includes the predefined keyword according to a processing method corresponding to the predefined keyword.

17. The one or more computer readable media of claim 16, wherein:
the notification message of the application comprises one of:
a notification message of a system application,
a notification message of a third-party application, or
a notification message of a new message received by a short messaging application; and
the notification message of the third-party application includes a notification message of new information received by an instant messaging application or a notification message of new information pushed by an application client.

18. The one or more computer readable media of claim 16, wherein detecting that the notification message of the application includes the predefined keyword includes:
performing an image recognition on a picture in information content of the notification message;
converting the recognized image of the picture from the image recognition into image textual information;
querying whether the image textual information includes the predefined keyword in the keyword set; and
determining that the notification message that includes the predefined keyword is detected in response to a query result indicating that the image textual information includes the predefined keyword.

19. The one or more computer readable media of claim 16, wherein the predefined keyword included in the keyword set comprises a predefined keyword that is downloaded from a cloud server and/or a predefined keyword that is self-defined by the electronic device.

20. The one or more computer readable media of claim 16, wherein detecting, through the interface of the auxiliary function of the operating system of the electronic device includes:
detecting whether application property information of the notification message satisfies the predefined condition, wherein the predefined condition further comprises one or more of a name of the application, a type of the application, a space occupied by the application after installation, an application packet name defined by the application and corresponds to the predefined keyword, and memory occupied by the application after being activated.

* * * * *